(12) United States Patent
Chou et al.

(10) Patent No.: US 12,395,245 B2
(45) Date of Patent: Aug. 19, 2025

(54) OPTICAL COMMUNICATION CONNECTION DEVICE

(71) Applicants: OptoMedia Technology Inc., Hsinchu County (TW); Hui Tsuo Chou, Hsinchu County (TW)

(72) Inventors: Hui Tsuo Chou, Hsinchu County (TW); Pei Hsiang Hsu, Hsinchu County (TW); Ming Hsiang Huang, Hsinchu County (TW)

(73) Assignees: OPTOMEDIA TECHNOLOGY INC., Zhubei (CN); Hui Tsuo Chou, Hui Tsuo (TW)

( * ) Notice: Subject to any disclaimer, the term of this patent is extended or adjusted under 35 U.S.C. 154(b) by 252 days.

(21) Appl. No.: 18/119,302

(22) Filed: Mar. 9, 2023

(65) Prior Publication Data

US 2023/0291477 A1 Sep. 14, 2023

Related U.S. Application Data

(60) Provisional application No. 63/318,667, filed on Mar. 10, 2022.

(51) Int. Cl.
*H04B 10/40* (2013.01)

(52) U.S. Cl.
CPC .................................. *H04B 10/40* (2013.01)

(58) Field of Classification Search
None
See application file for complete search history.

(56) References Cited

U.S. PATENT DOCUMENTS

| 9,252,882 | B2 * | 2/2016 | Chien | G02B 6/4277 |
|---|---|---|---|---|
| 2004/0086240 | A1 * | 5/2004 | Togami | H05K 1/144 |
| | | | | 385/88 |
| 2005/0135758 | A1 * | 6/2005 | Sato | G02B 6/4201 |
| | | | | 385/94 |
| 2007/0280603 | A1 * | 12/2007 | Sakata | H01R 13/6594 |
| | | | | 385/88 |
| 2008/0062640 | A1 * | 3/2008 | Anderl | H04B 10/806 |
| | | | | 361/690 |
| 2014/0064677 | A1 * | 3/2014 | Teo | H04B 10/40 |
| | | | | 385/92 |
| 2020/0073052 | A1 * | 3/2020 | Lin | G02B 6/4254 |

FOREIGN PATENT DOCUMENTS

JP 2004273924 A * 9/2004

* cited by examiner

*Primary Examiner* — Pranesh K Barua
(74) *Attorney, Agent, or Firm* — Chun-Ming Shih; HDLS IPR SERVICES

(57) ABSTRACT

The invention relates to an optical communication connection device, which includes an optical receiving unit, an optical transmitting unit, a circuit board and a connection interface. The optical receiving unit and the optical transmitting unit are connected to the connection interface through the circuit board, and the connection interface is used to connect to an external circuit board. The connection interface has a plurality of first connection terminals connected to the circuit board and a plurality of second connection terminals being used to connect to the external circuit board. The second connection terminal is substantially parallel to the external circuit board, and is connected to the external circuit board through surface mount technology, which is not only conducive to reduce the size of the optical communication connection device, but also improve the high-frequency characteristics thereof.

4 Claims, 5 Drawing Sheets

OPTICAL COMMUNICATION CONNECTION DEVICE

CROSS-REFERENCE TO RELATED APPLICATIONS

This non-provisional application claims priority claim under 35 U.S.C. § 119(e) on U.S. Provisional Patent Application No. 63/318,667 filed on Mar. 10, 2022, the entire contents of which are incorporated herein by reference.

TECHNICAL FIELD

This disclosure is an optical communication connection device, which is not only conducive to reduce the size of the optical communication connection device, but also improve the high-frequency characteristics.

BACKGROUND

Optical communication is a communicating technology using light to carry information, which is also known as optical telecommunication, wherein fiber-optic communication is nowadays the most commonly used technology. The fiber-optic communication is mainly performed by transferring information within optical fibers, which is categorized as one type of wired communication. The fiber-optic communication has several advantages, such as capable of transferring large-size data, also with fine confidentiality, hence becomes mainstream of the wired communication technologies.

In technic field of the optical communication, optic-connecting device is a significant component for receiving and transmitting optical signals, for example, gigabit interface converter (GBIC) is one type of the optic-connecting device. The optic-connecting device is mainly disposed on a console device, and includes an optical transmitter and an optical receiver. The optical transmitter is for converting electric signal into optical signal and transferring the optical signal via the optical fibers, where the optical receiver is for converting the optical signal back to electric signal and transferring to the console device.

SUMMARY

Currently on-market optic-connecting devices are large-sized, which can be a drawback for assembling into computer. Therefore, this disclosure provide an optical communication connection device, wherein a connection interface of the optical communication connection device is connected to an external circuit board through surface mount technology, which is conducive to reduce the size of the optical communication connection device.

Connection terminals of the optical communication connection device of this disclosure is approximately parallel to the surface of the external circuit board, and is connected to the external circuit board through surface mount technology to improve the high-frequency characteristics thereof.

To achieve the aforementioned object, the disclosure provides an optical communication connection device, comprising: a circuit board; an optical receiving unit electrically connected to the circuit board for receiving an optical signal; an optical transmitting unit electrically connected to the circuit board for transmitting an optical signal; a connection interface including a plurality of first connection terminals and a plurality of second connection terminals, and an angle being defined between the plurality of first connection terminals and the plurality of second connection terminals, wherein the angle has a range from 45 degrees to 135 degrees, wherein the plurality of first connection terminals are connected to the circuit board, and the plurality of the second connection terminals are connected to an external circuit board through a surface mount technology; and a supporting frame located between the connection interface and the circuit board for supporting the circuit board.

The disclose further provides an optical communication connection device, comprising: a circuit board; at least one chip disposed on a surface of the circuit board; a first heat conduction layer disposed on a surface of the at least one chip or the circuit board; an optical receiving unit electrically connected to the circuit board for receiving an optical signal; an optical transmitting unit electrically connected to the circuit board for transmitting an optical signal; a connection interface including a plurality of first connection terminals and a plurality of second connection terminals, and an angle being defined between the plurality of first connection terminals and the plurality of second connection terminals, wherein the angle has a range from 45 degrees to 135 degrees, wherein the plurality of first connection terminals are connected to the circuit board, and the plurality of the second connection terminals are connected to an external circuit board through a surface mount technology; and a supporting thermal column connected to the first heat conduction layer, and connected to the surface of the at least one chip or connected to the surface of the circuit board via the first heat conduction layer.

BRIEF DESCRIPTION OF THE DRAWINGS

The structure as well as preferred modes of use, further objects, and advantages of this present disclosure will be best understood by referring to the following detailed description of some illustrative embodiments in conjunction with the accompanying drawings, in which.

DETAILED DESCRIPTION OF THE PREFERRED EMBODIMENTS

Figure 1:
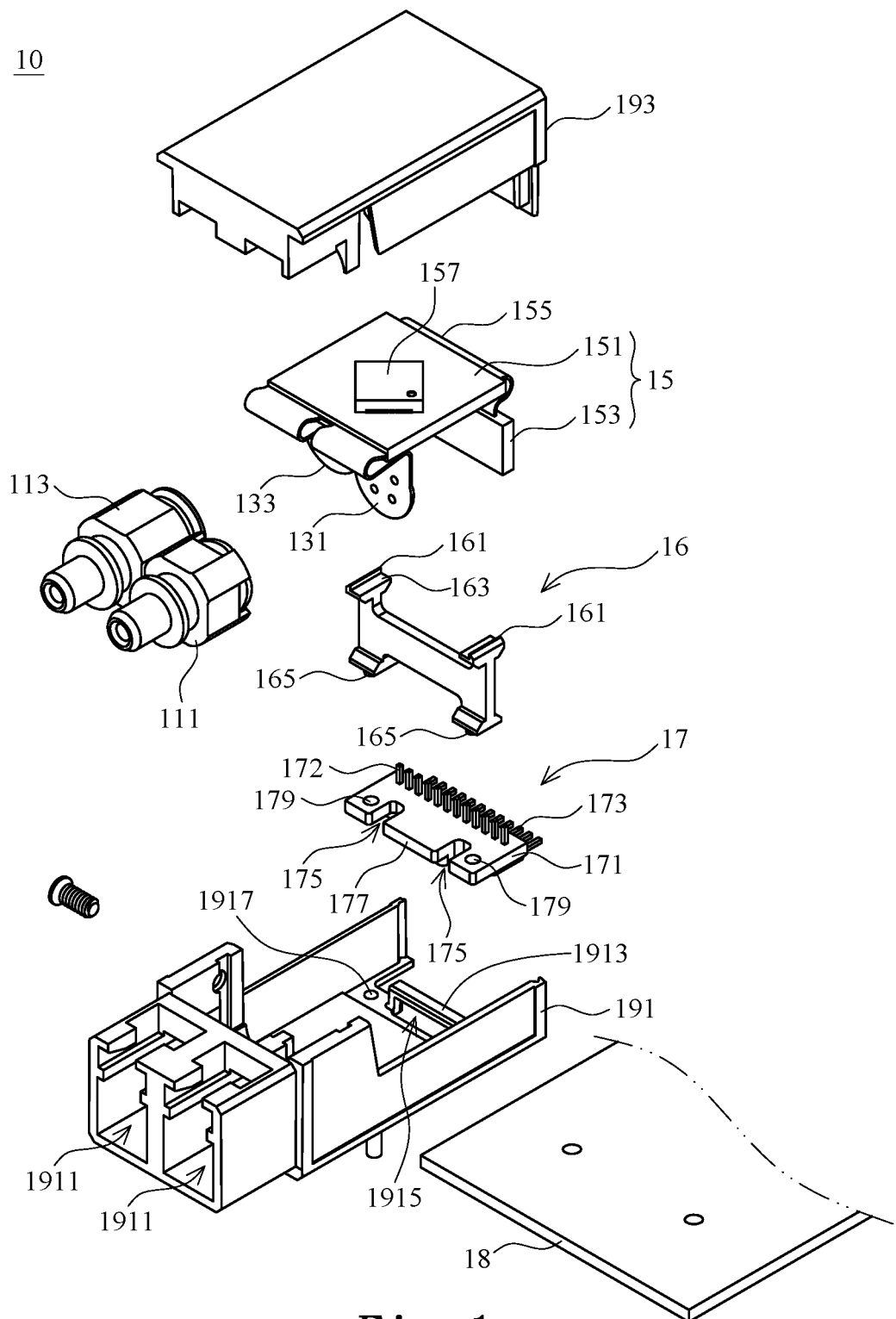
FIG. 1 is a three-dimensional exploded view of an optical communication connection device according to an embodiment of this disclosure.
Figure 3:
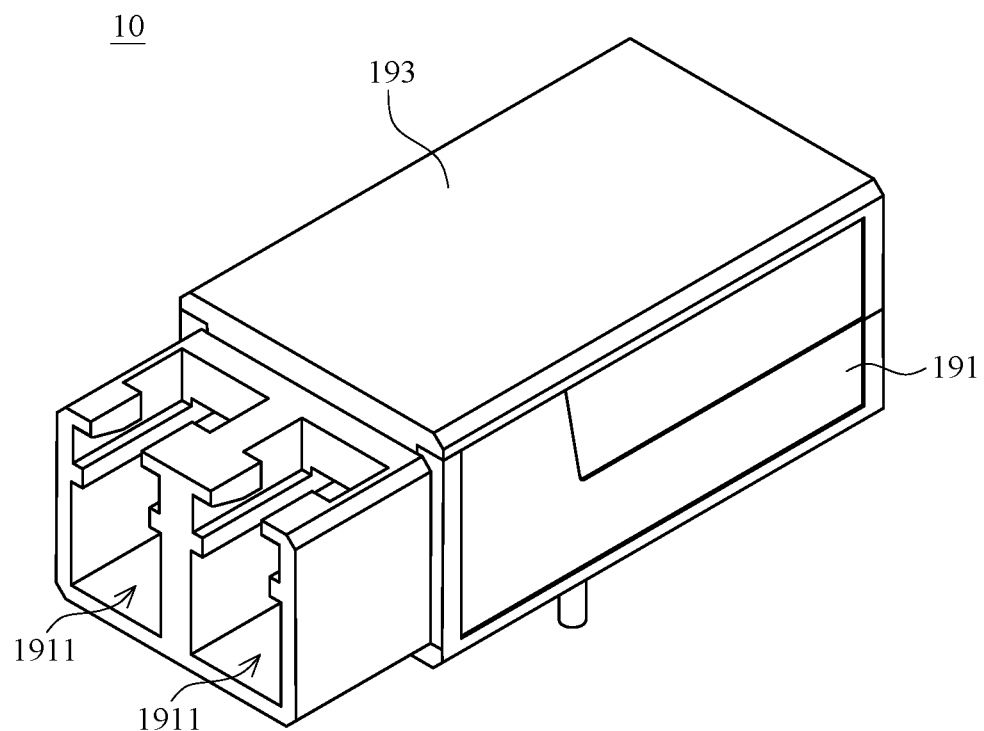
FIG. 3 is a three-dimensional schematic diagram of the optical communication connection device according to an embodiment of this disclosure.

FIG. 1 and FIG. 3 are respectively a three-dimensional exploded view and a three-dimensional schematic diagram of an optical communication connection device according to an embodiment of this disclosure. The optical communication connection device 10 includes an optical receiving unit 111, an optical transmitting unit 113, a circuit board 15, a supporting frame 16 and a connection interface 17. The optical receiving unit 111 and the optical transmitting unit 113 are connected to the connection interface 17 through the circuit board 15, and the connection interface 17 is configure to connect to an external circuit board 18.

The circuit board 15 may include a first circuit board 151 and a second circuit board 153, and the first circuit board 151 is connected to the second circuit board 153 via a conductive portion 155. For example, the conductive portion 155 may be a conductive wire. In addition, an angle is defined between the first circuit board 151 and the second circuit board 153, and the angle may have a range from 45 degrees to 135 degree, and preferably 90 degrees, so that the first circuit board 151 and the second circuit board 153 have a cross section proximately L-shaped.

The optical receiving unit 111 is configured to receive an optical signal, and is connected to the circuit board 15 via a first conductive unit 131, such as conductive wire. For example, the optical receiving unit 111 is electrically connected to the first circuit board 151 and is located below the first circuit board 151, and the connection interface 17 is connected to the second circuit board 153. Specifically, the optical receiving unit 111 may include at least one photodetector to convert the received optical signal into an electric signal via photoelectric effect. The connecting interface 17 is an electric connection interface, wherein the converted electric signal from the optical receiving unit 111 is transferred to the connecting interface 17.

The optical transmitting unit 113 is configure to generate and emit an optical signal, and is connected to the circuit board 15 through a second conductive unit 133, such as conductive wire. For example, the optical receiving unit 111 is electrically connected to the first circuit board 151, and is located below the first circuit board 151. Specifically, the optical transmitting unit 113 may include at least one light-emitting diode (LED) or at least one laser diode, to generate the optical signal in accordance with the electric signal transmitted by the connecting interface 17.

The circuit board 15 may not only be electrically connected to the optical receiving unit 111, the optical transmitting unit 113 and the connecting interface 17, but also disposed with a drive circuit, an amplifier circuit, a comparer and/or a phase-locked loop (not shown), etc. thereon. The drive circuit is electrically connected to the optical receiving unit 111 and/or the optical transmitting unit 113, for such as driving the LED within the optical transmitting unit 113 to transmit the optical signal. The amplifier circuit, the comparer and the phase-locked loop are electrically connected to the optical receiving unit 111, in a manner such as to have a transimpedance amplifier (TIA) converting photo current into voltage signal, a limiting amplifier (LA) to amplify the voltage signal, then a clock and data recovery (CDR) to process the voltage signal and generate a square wave signal with a fixed clock period, for a post-staged digital circuit to process this converted square wave signal.

In one embodiment of this disclosure, the optical communication connection device 10 is usually powered by a drive power source, for performing the conversion between optical signal and electric signal. Generally, the optical communication connection device 10 may be disposed in an electronic (e. g. computer), and the electronic supplies power to the optical communication connection device 10 via the connecting interface 17. For example, the connecting interface 17 may include a power pin to receive power, for driving the entire optical communication connection device 10 to receive or transmit optical signal.

The connection interface 17 is connected to the circuit board 15. For example, the connection interface 17 may be connected to the second circuit board 153 of the circuit board 15. In one embodiment of the disclosure, the connection interface 17 includes a main body 171, a plurality of first connection terminals 172 and a plurality of second connection terminals 173. An angle is defined between the first connection terminals 172 and the second connection terminals 173, and the angle may have a range from 45 degrees to 135 degree, and preferably 90 degrees. The first connecting terminal 172 is used to connect to the circuit board 15, and the second connecting terminal 173 is used to connect to an external circuit board 18, wherein the external circuit board 18 is a circuit board disposed outside the optical communication connecting device 10.

Specifically, the extension direction of the first connection terminals 172 is approximately parallel to the surface of the second circuit board 153, and the extension direction of the second connection terminals 173 is approximately parallel to the surface of the external circuit board 18. The second connection terminals 173 is connected to the external circuit board 18 through surface mount technology (SMT), which not only helps to reduce the size of the optical communication connection device 10, but also enables the optical communication connection device 10 to have better high frequency characteristic. In addition, the first connection terminals 172 may be connected to the second circuit board 153 through surface mount technology.

In one embodiment of the disclosure, the appearance of the main body 171 may be similar to a cuboid or a plate, and the first connection terminals 172 and the second connection terminals 173 are respectively arranged on two adjacent surfaces of the main body 171. For example, the first connection terminals 172 are disposed on the upper surface of the main body 171, and the second connection terminals 173 are disposed on the side surface of the main body 171, wherein the first connection terminals 172 may be approximately perpendicular to the second connection terminals 173.

The optical communication connection device 10 may include a bottom seat 191 and a cover shell 193, wherein the optical receiving unit 111 and the optical transmitting unit 113 are disposed on the bottom seat 191. Specifically, the bottom seat 191 may have two connecting holes 1911 disposed at an end or a side surface thereof, the optical receiving unit 111 and the optical transmitting unit 113 are respectively disposed toward the two connecting holes 1911 of the bottom seat 191. In practical use, two optical connectors (not shown) may respectively plug into the two connecting holes 1911 of the bottom seat 191, such that to align the optical connectors with the optical receiving unit 111 and the optical transmitting unit 113 within the connecting holes 1911, and therefore able to receive and/or transmit optical signal by the optical communication connection device 10.

The connecting holes 1911 of the bottom seat 191 may be common optical connecting sockets (female connector), such as ST socket, SC socket` FC socket or LC socket, etc., for plugging the corresponded optical connectors into the connecting holes 191, such as ST plug to ST socket, SC plug to SC socket, FC plug to FC socket or LC plug to LC socket.

In one embodiment of this disclosure, the bottom seat 191 may include an inverted U-shaped protrusion 1913, and a connection hole 1915 is formed between the inverted U-shaped protrusion 1913 and the bottom seat 191. For example, the inverted U-shaped protrusion 1913 and the optical connection hole 1911 are respectively located at two opposite ends of the bottom seat 191.

In addition, the main body 171 of the connection interface 17 may be provided with two grooves 175 and a protrusion 177, wherein the protrusion 177 is located between the two grooves 175. Specifically, one end or one side surface of the main body 171 is provided with the second connection terminals 173, while the other end or the other side surface of the main body 171 is provided with two grooves 175 to form the protrusion 177 between two grooves 1751, wherein the second connecting terminals 173 and the grooves 175 are respectively disposed on opposite ends or two side surfaces of the main body 171. In actual application, the protrusion 177 of the connection interface 17 is inserted into the connection hole 1915 between the inverted U-shaped convex protrusion 1913 and the bottom seat 191, and the two sides of the inverted U-shaped convex protrusion 1913 connected to the bottom seat 191 are respectively located in two grooves 175 to position the bottom seat 191 and the connection interface 17, and connect and fix the bottom seat 191 and the connection interface 17.

In one embodiment of this disclosure, a plurality of positioning holes 179 may be provided on the main body 171 of the connecting interface 17. For example, the number of positioning holes 179 may be two, and they are respectively provided outside the two grooves 175. The bottom seat 191 is provided with a plurality of first positioning protrusions 1917, and the position and number of the first positioning protrusions 1917 correspond to the positioning holes 179 of the main body 171. For example, the number of the first positioning protrusions 1917 may be two, and they are located at both sides of the inverted U-shaped protrusion 1913. As the protrusion 177 of the main body 171 is inserted into the connection hole 1915 between the bottom seat 191 and the inverted U-shaped protrusion 1913, the first positioning protrusions 1917 can be further arranged in the positioning holes 179 to position the connection interface 17 and the bottom seat 191.

The cover shell 193 is configure to connect the bottom seat 191, and the optical receiving unit 111, the optical transmitting unit 113, the circuit board 15, the supporting frame 16 and/or the connection interface 17 are located inside of a containing space between the bottom seat 191 and cover shell 193 and hence protected by the bottom seat 191 and the cover shell 193.

Figure 2:
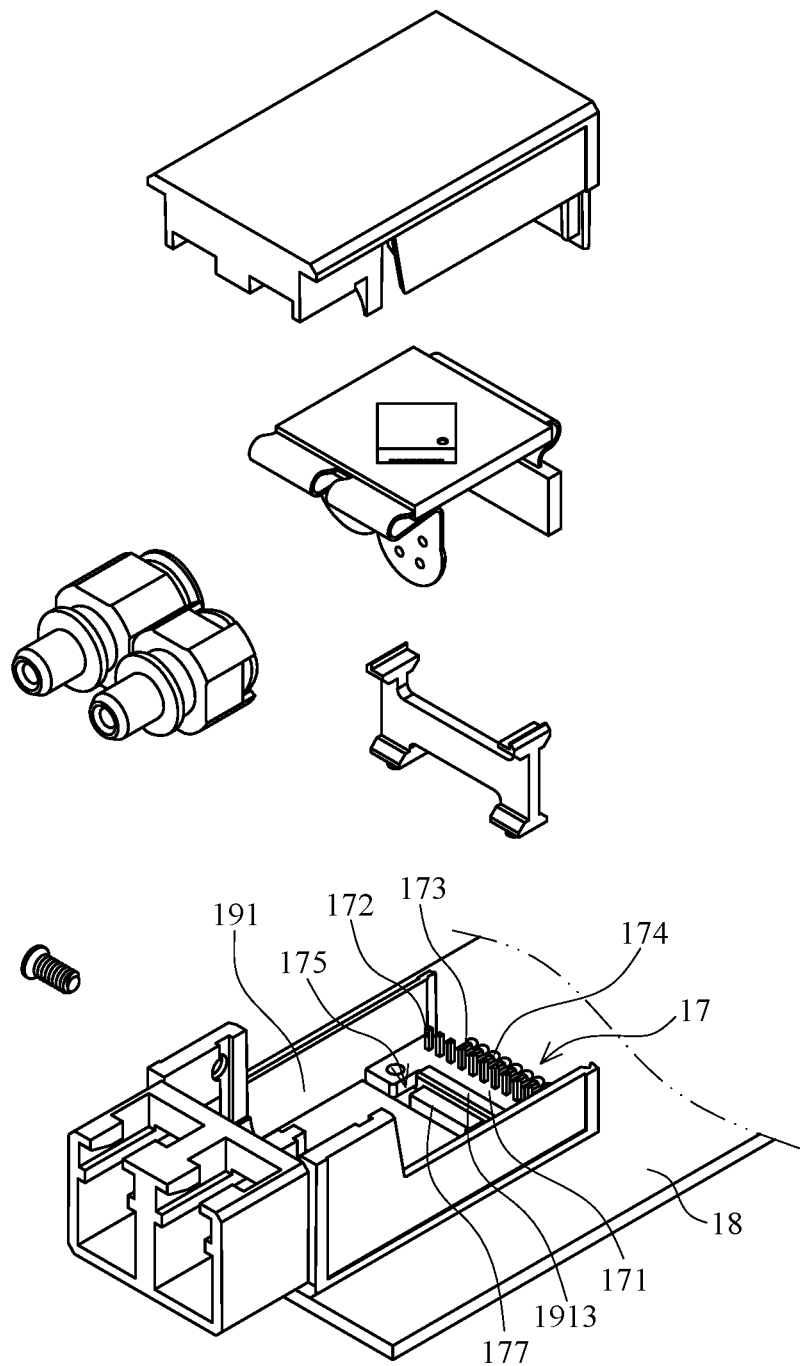
FIG. 2 is a connection schematic diagram of a bottom seat, a connection interface and an external circuit board of the optical communication connection device according to an embodiment of this disclosure.

As shown in FIG. 2, the bottom seat 191 may be arranged on the external circuit board 18, such as a motherboard or a network interface converter of a computer, and the second connection terminals 173 of the connection interface 17 are connected to the circuit on the external circuit board 18. The second connection terminals 173 are parallel to the surface of the external circuit board 18, and the second connection terminals 173 can be connected to the external circuit board 18 through surface mount technology. For example, the second connection terminals 173 are connected with the circuit on the external circuit board 18 through solder paste 174.

In one embodiment of this disclosure, a supporting frame 16 may be further provided between the connection interface 17 and the circuit board 15 to support and fix the position of the circuit board 15. For example, the supporting frame 16 may be used to support the first circuit board 151 of the circuit board 15 to prevent the first circuit board 151 from moving toward the connection interface 17.

Specifically, the supporting frame 16 may be plate-shaped, such as an H-shaped supporting frame, wherein the top of the supporting frame 16 or both sides of the top surface may be provided with two bearing protrusions 161, and a beating recess 163 is formed between the two bearing protrusions 161. The first circuit board 151 of the circuit board 15 can be placed in the bearing recess 163 of the supporting frame 16, while the bearing protrusions 161 are located on both sides and under side of the first circuit board 151, so that the supporting frame 16 can be used to fix and support the first circuit board 151. In addition, the side surface of the supporting frame 16 may be adjacent to the second circuit board 153 and may be used to limit the position of the second circuit board 153.

In one embodiment of this disclosure, the bottom of the supporting frame 16 may be provided with two second positioning protrusions 165 that are configure to be arranged in the two positioning holes 179 of the connection interface 17, so as to position and arrange the supporting frame 16 on the main body 171 of the connection interface 17. For example, the positioning hole 179 may be a through hole penetrating through the upper and lower surfaces of the main body 171.

Figure 4:
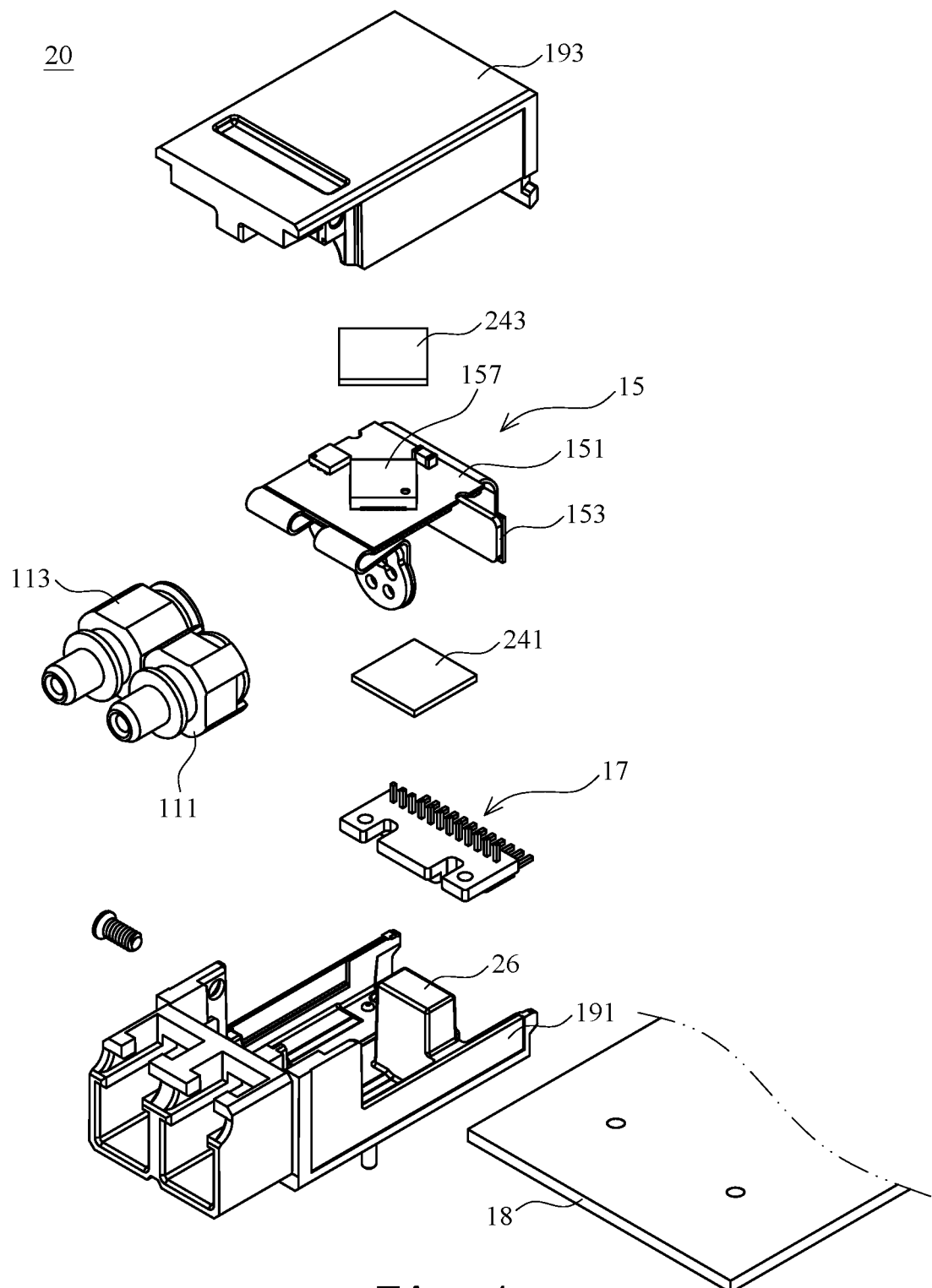
FIG. 4 is a three-dimensional exploded view of the optical communication connection device according to another embodiment of this disclosure.

FIG. 4 is a three-dimensional exploded view of the optical communication connection device according to another embodiment of this disclosure. The optical communication connection device 20 of the embodiment includes an optical receiving unit 111, an optical transmitting unit 113, a circuit board 15, a supporting thermal column 26, at least one heat conduction layer and a connection interface 17. The optical receiving unit 111 and the optical transmitting unit 113 are connected to the connection interface 17 via the circuit board 15, and the connection interface 17 is configure to connected to an external circuit board 18.

The optical communication connection device 20 of this embodiment is similar to the optical communication connection device 10 of FIG. 1. The optical communication connection device 20 of this embodiment replaces the supporting frame 16 of the optical communication connection device 10 in FIG. 1 with a support thermal column 26.

Figure 5:
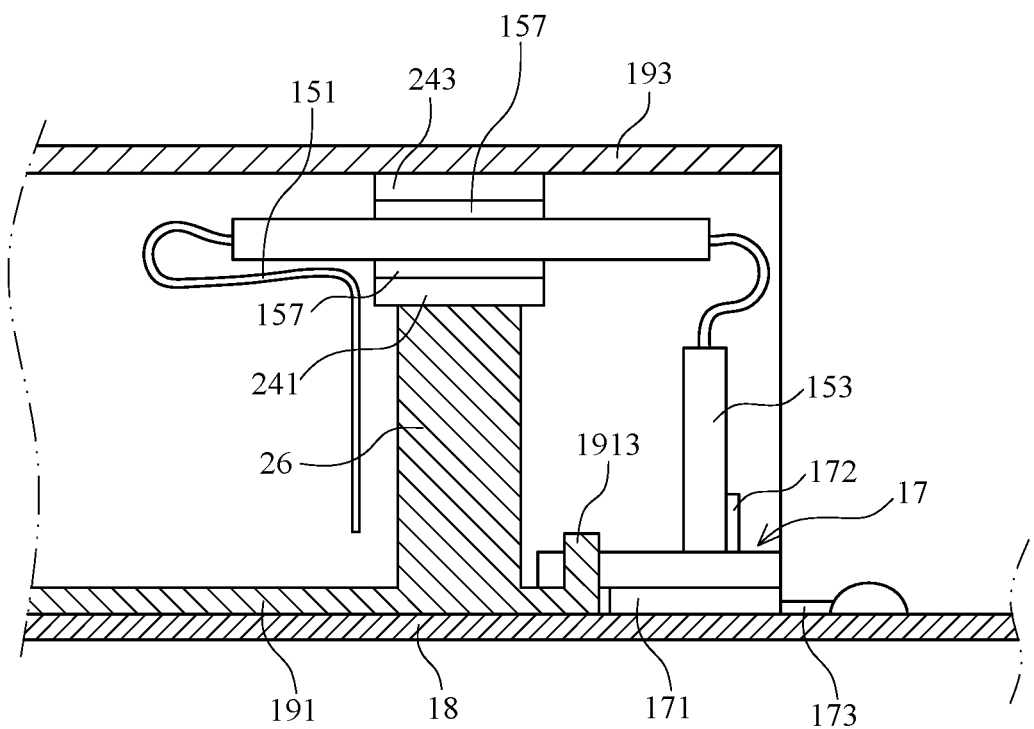
FIG. 5 is a cross section exploded view of the partial structure of the optical communication connection device according to an embodiment of this disclosure.

As shown in FIG. 5, the support thermal column 26 may be a columnar body disposed on the bottom seat 191 and located between the optical connection hole 1911 and the connection hole 1915. The first circuit board 151 of the circuit board 15 can be placed on the support thermal column 26 to support the first circuit board 151.

In one embodiment of this disclosure, at least one chip 157 is arranged on the upper surface and/or lower surface of the first circuit board 151, and a first heat conduction layer 241 is disposed on the surface of the chip 157 located on the lower surface of the first circuit board 151. The support thermal column 26 is connected to the chip 157 on the lower surface of the first circuit board 151 through the first heat conduction layer 241. The first heat conduction layer 241 is a member with good heat conduction properties, such as a metal sheet or heat dissipation glue. In other embodiment of this disclosure, the first heat conduction layer 241 is disposed on the surface of the first circuit board 151 of the circuit board 15, and the support thermal column 26 is connected to the first circuit board 151 through the first heat conduction layer 241.

The support thermal column 26 can be made of heat-conducting material. For example, the support thermal column 26 may be made of metal, so that heat generated by the chip 157 located on the lower surface of the first circuit board 151 can be transferred to the support thermal column 26 to reduce the operating temperature of the chip 157.

In one embodiment of this disclosure, the bottom seat 191 may be made of heat-conducting material. For example, the bottom seat 191 can be made of metal, so that the chip 157 arranged on the lower surface of the first circuit board 151 can transfer heat to the bottom seat 191 through the first head conduction layer 241 and support thermal column 26 in sequence, while the heat is transferred to the outside through the bottom seat 191 to further reduce the temperature of the chip 157.

In another embodiment of this disclosure, a second heat conduction layer 243 is disposed on the surface of the chip 157 disposed on the upper surface of the first circuit board 151. After the cover shell 193 is connected to the bottom seat 191, the cover shell 193 is connected to the chip 157 located on the upper surface of the first circuit board 151 through the second heat conduction layer 243. In actual application, the cover shell 193 may be made of heat-conducting material. For example, the cover body 193 may be made of metal, so that the chip 157 arranged on the upper surface of the first circuit board 151 can transfer heat through the second heat conduction layer 243 to the cover shell 193, and transfer heat to the outside through the cover shell 193 to reduce the temperature of the chip 157.

In one embodiment of this disclosure, the main body 171 of the connection interface 17 may be a trapezoidal plate body. When one end of the connection interface 17 is inserted into the inverted U-shaped protrusion 1913, the bottom of the connection interface 17 or the main body 171 is kept on the same plane as the bottom of the bottom seat 191, so as to facilitate disposing the bottom seat 191 and the connection interface 17 on the surface of the external circuit board 18. Then, the external circuit board 18 and the second connection terminals 173 of the connection interface 17 can be connected through the surface mount technology, which not only helps to further reduce the size of the optical communication connection device 20, but also makes the optical communication connection device 20 have better high-frequency characteristics.

The above disclosure is only the preferred embodiment of the present disclosure, and not used for limiting the scope of the present disclosure. All equivalent variations and modifications on the basis of shapes, structures, features and spirits described in claims of the present disclosure should be included in the claims of the present disclosure.

We claim:

1. An optical communication connection device, comprising:
   a circuit board;
   at least one chip disposed on a surface of the circuit board;
   a first heat conduction layer disposed on a surface of the at least one chip or the circuit board;
   an optical receiving unit electrically connected to the circuit board for receiving an optical signal;
   an optical transmitting unit electrically connected to the circuit board for transmitting an optical signal;
   a connection interface including a plurality of first connection terminals and a plurality of second connection terminals, and an angle being defined between the plurality of first connection terminals and the plurality of second connection terminals, wherein the angle has a range from 45 degrees to 135 degrees, wherein the plurality of first connection terminals are connected to the circuit board, and the plurality of the second connection terminals are connected to an external circuit board through a surface mount technology;
   a supporting thermal column connected to the first heat conduction layer, and connected to the surface of the at least chip or connected to the surface of the circuit board via the first heat conduction layer;
   a bottom seat including two optical connection holes, wherein the optical receiving unit and the optical transmitting unit are respectively disposed toward the two optical connection holes, and the support thermal column is disposed on the bottom seat;
   at least one inverted U-shaped protrusion disposed on the bottom seat to form a connection hole between the bottom seat and the inverted U-shaped protrusion, wherein the connection interface includes a main body, and the plurality of first connection terminals and the plurality of second connection terminals are located on the main body; and
   two grooves and a protrusion disposed on the main body, wherein the protrusion is configure to insert into the connection hole between the bottom seat and the inverted U-shaped protrusion to position the connection interface and the bottom seat.

2. The optical communication connection device as claimed in claim 1, further comprising:
   a cover shell connected to the bottom seat, wherein the circuit board, the support thermal column and the connection interface are located between the bottom seat and the cover shell.

3. The optical communication connection device as claimed in claim 2, wherein the circuit board comprises a first circuit board and a second circuit board, the first circuit board is connected to the second circuit board via a conductive portion, and an angle is formed between the first circuit board and the second circuit board, wherein the angle between the first circuit board and the second circuit board has a range from 45 degrees to 135 degrees.

4. The optical communication connection device as claimed in claim 3, wherein the first connection terminals of the connection interface are parallel to a surface of the second circuit board, and the second connection terminals of the connection interface are parallel to a surface of the external circuit board.

* * * * *